July 7, 1964

P. D. SENSTAD 3,140,440

NUCLEAR RESONANT CONTROL APPARATUS

Filed Oct. 2, 1961

INVENTOR.
PAUL D. SENSTAD
BY Roger W. Jensen
ATTORNEY.

United States Patent Office 3,140,440
Patented July 7, 1964

3,140,440
NUCLEAR RESONANT CONTROL APPARATUS
Paul D. Senstad, Minneapolis, Minn., assignor to Minneapolis-Honeywell Regulator Company, Minneapolis, Minn., a corporation of Delaware
Filed Oct. 2, 1961, Ser. No. 142,296
8 Claims. (Cl. 324—.5)

This invention pertains generally to nuclear resonant control apparatus and more particularly to a system for automatically finding the resonant frequency of a material and giving a readout indication of the resonant frequency. The invention in this particular device is a feedback system which gives greater accuracy than previously designed systems.

The invention in this application is somewhat similar to a co-pending application (now abandoned), Serial No. 131,797, filed August 16, 1961 by Marlo J. Larson and assigned to the same assignee as the present invention. The present invention however incorporates a new and novel analog-digital-analog conversion system in its feedback network and provides for a greater accuracy in frequency control and readout than is possible in the above-mentioned copending application.

The system such as disclosed herein may be used not only for obtaining the resonant frequency of a material in a constant magnetic field to determine what material is contained therein, but it may also be used with a known material to detect variations in the strength of a magnetic field. The strength of the magnetic field being detected may be produced by the current flowing in wires connected to a gyro torquing motor to thereby determine the displacement of a gyro as one application of this device. Many other uses will be apparent to anyone skilled in the art as applications in which accurate determinations of varying strengths of magnetic fields is necessary. Another use to which this apparatus is well suited is in determining or detecting electric quadrupole moment resonance which does not depend upon a magnetic field but only upon the electric field produced by the nuclei of the material which are contained within the field produced by the device disclosed herein.

It is an object of this invention to provide a new and novel feedback circuit for automatic readout of nuclear magnetic resonance circuitry.

Another object of this invention is to provide apparatus which will give increased accuracy in the determination of the field strength of magnetic fields.

Further objects will become apparent through a reading of the specification and appended claims in combination with the accompanying drawings of which:

Figure 1:
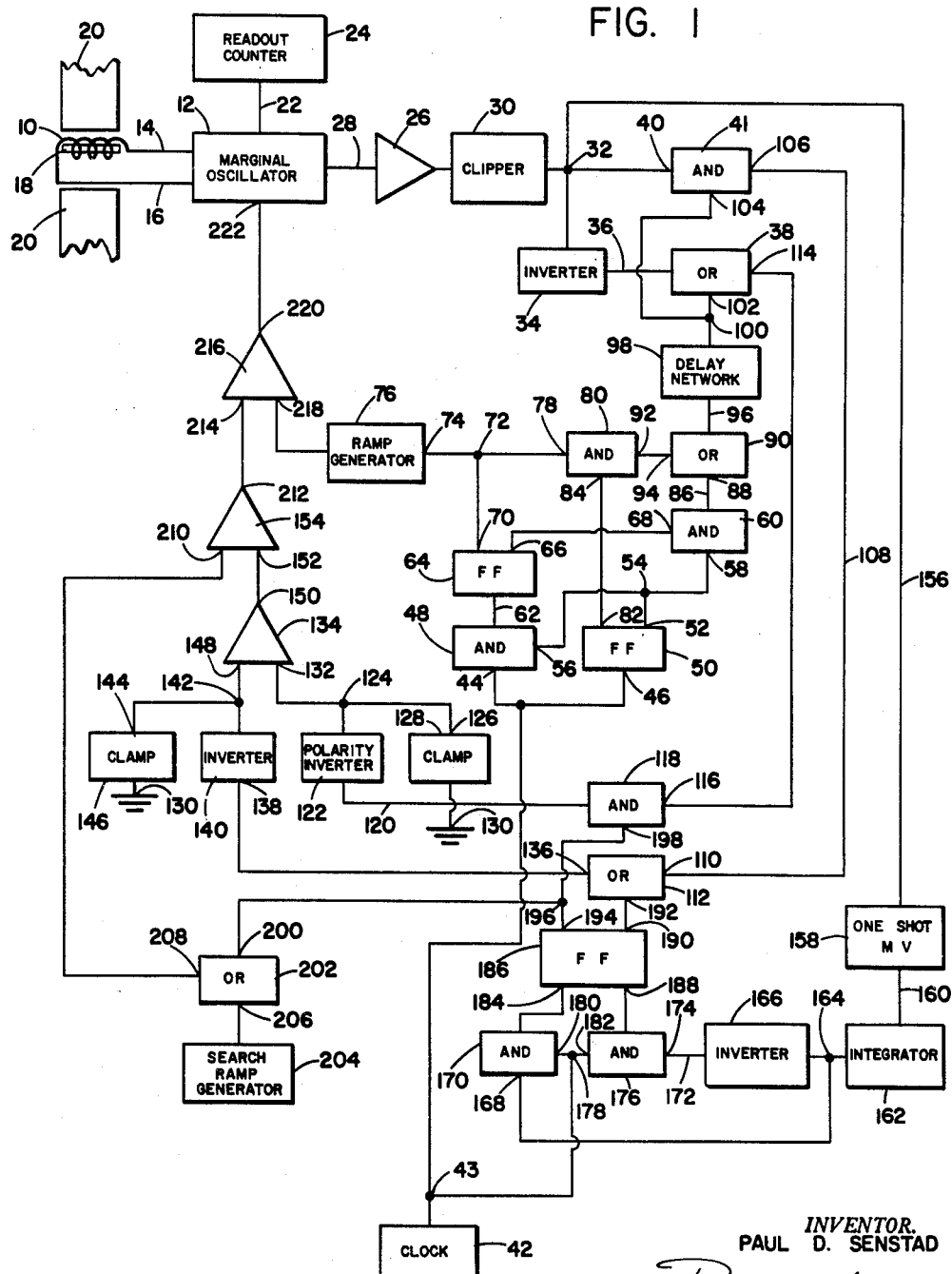
FIGURE 1 is a block diagram of the complete nuclear resonance circuitry.

In FIGURE 1 a coil 10 is shown connected to a marginal oscillator 12 by lead wires 14 and 16. The oscillator 12 along with the coil 10 may be termed a variable frequency field producing means. Within the coil 10 is a sample of material generally designated as 18 which is suitable for use in nuclear resonance work. One such suitable material is water for applications where the water is not likely to be frozen. Many other substances with a nucleus having a nonzero spin may be used also. To obtain a definition of nonzero spin, the book Nuclear Magnetic Resonance by E. R. Andrew of Cambridge University, Chapers 1 and 2, copyright 1956, provides adequate reference material. The coil 10 and the material 18 are contained within a magnetic field produced by a pair of poles 20 which are only illustrated for convenience. Any other means for producing a magnetic field such as current through the wire could also be used. A lead 22 connects the marginal oscillator to a readout counter or frequency determining means 24. An amplifier 26 is connected to receive signals from the marginal oscillator 12 by a lead 28. A clipper 30 receives signals from the amplifier 26 and clips the signals to a desired or predetermined height before applying them to a junction point 32. An inverter 34 is connected to receive signals from the junction point 32 and applies them through a lead 36 to an OR circuit or gating circuit 38. The junction point 32 is also connected to an input 40 of an AND circuit or gating circuit 41. The AND circuit 41 together with or separate from the OR circuit 38 may alternatively be designated as logic means. This terminology applies to many different combinations of AND, OR, NOR and flip-flop circuitry. A clock pulse generator or time reference pulse producing means 42 has its output or gating circuit connected to a junction point 43. The junction point 43 is connected to inputs 44 and 46 of an AND circuit 48 and a flip-flop circuit 50 respectively. A first output 52 of flip-flop 50 is connected to a junction point 54. The junction point 54 is connected to an input 56 of the AND circuit 48 and also to an input 58 of an AND circuit 60. The output of AND circuit 48 is connected by a lead 62 to the input of the flip-flop 64. The flip-flops such as 64 may be any standard multivibrator which requires an input signal to change the state or condition of the output signal. One output 66 of the flip-flop 64 is connected to a second input 68 of the AND circuit 60. A second output 70 of flip-flop 64 is connected to a junction point 72. The junction point 72 is connected to an input 74 of a ramp generator or sweep signal generating means 76. The junction point 72 is also connected to an input 78 of an AND circuit 80. A second output 82 of flip-flop 50 is connected to a second input 84 of AND circuit 80. The output of the AND circuit 60 is connected by a lead 86 to an input 88 of an OR circuit 90. An output 92 of the AND circuit 80 is connected to an input 94 of the OR circuit 90. The output of OR circuit 90 is connected by a lead 96 to a delay network or phase shifting means 98. The output of delay network 98 is connected to a junction point 100. The junction point 100 is connected to an input 102 of the OR circuit 38 and also to an input 104 of the AND circuit 41. An output 106 of the AND circuit 41 is connected by a lead 108 to an input 110 of an OR circuit 112. An output 114 of the OR circuit 38 is connected to an input 116 of an AND circuit 118. The output of AND circuit 118 is connected by a lead 120 to the input of a polarity inverter 122. The output of polarity inverter 122 is connected to a junction point 124 and from there to an input 126 of a clamping or Zener diode circuit 128. Another lead of the clamping circuit 128 is connected to ground 130. The clamping circuit 128 is in one application merely a Zener diode to prevent the voltage at junction point 124 from exceeding a preset limit. The junction point 124 is also connected to an input 132 of a summing amplifier 134. An output 136 of OR circuit 112 is connected to an input 138 of an inverter 140. The inverter 140 is not the same as the polarity inverter 122 since the polarity inverter 122 not only changes the signal in direction from a reference point but also changes it in polarity. The output of inverter 140 is connected to a junction point 142 and from there to an input 144 of a clamping circuit 146 which is similar to clamping circuit 128. A second lead of the clamping circuit 146 is connected to ground 130. The junction point 142 is connected also to a second input 148 of the summing amplifier 134. An output 150 of amplifier 134 is connected to an input 152 of another summing amplifier 154. The junction point 32 is also connected by a lead 156 to the input of a one-shot multivibrator 158. The output of the one-shot multivibrator 158 is connected by a lead 160 to an integrator or integrating circuit 162. The output of the integrating circuit 162 is connected to a junction point 164. The junction point 164 is connected to an input of an inverter 166 and also to an input 168 of an AND circuit 170. The inverter 166 is connected by a lead 172 to an input 174 of an AND circuit 176. The junction point 43 is connected to a junction point 178 which connects to inputs 180 and 182 of AND circuits 170 and 176, respectively. An output of AND circuit 170 is connected to an input 184 of a flip-flop 186. The output of AND circuit 176 is connected to another input 188 of the flip-flop 186. One output 190 of flip-flop 186 is connected to a second input 192 of OR circuit 112. A second output 194 of flip-flop 186 is connected to a junction point 196 and from there to an input 198 of AND circuit 118. The junction point 196 is also connected to an input 200 of an OR circuit 202. A search ramp generator or search sweep signal generating means 204 is connected to another input 206 of the OR circuit 202. An output 208 of the OR circuit 202 is connected to an input 210 of the summing amplifier 154. An output 212 of the summing amplifier 154 is connected to an input 214 of another summing amplifier 216. Another input 218 of the summing amplifier 216 is connected to the output of the ramp generating means 76. An output 220 of the summing amplifier 216 is connected to another input 222 of the marginal oscillator 12.

Figure 2:
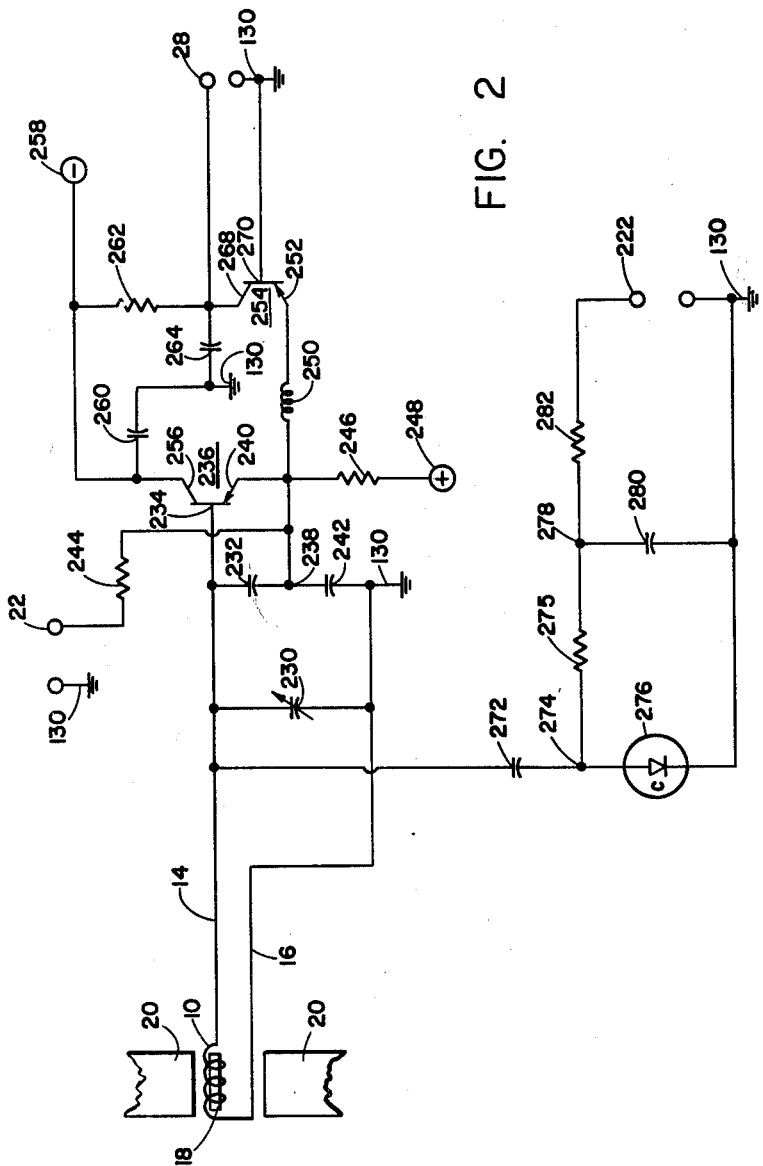
FIGURE 2 is a circuit diagram of the marginal oscillator used in the nuclear resonant circuitry of FIGURE 1.

In FIGURE 2 similar points will receive identical numbers to that used in FIGURE 1 so that with the exception of number 12 which is used as a general designation for the marginal oscillator shown in FIGURE 2 the numbers 10-22 will also be presented in FIGURE 2 and also the output lead 28 along with the input lead 222. A capacitor 230 is connected by a first lead to wire 14 and by a second lead to wire 16 and to ground 130. Wire 14 also is connected to one side of a capacitor 232 and to a base 234 of a transistor 236. The other lead of capacitor 232 is connected through junction point 238 to an emitter 240 of the transistor 236. The junction point 238 is also connected to one lead of a capacitor 242 which has its other lead connected to ground 130. A resistor 244 is connected between the terminal or lead 22 and the junction point 238. Another resistor 246 is connected between the junction point 238 and a positive power terminal 248 which may be of variable potential if desired (not shown). An inductive element 250 has one lead connected to the junction point 238 and the other lead connected to an emitter 252 of a transistor 254. A collector 256 of the transistor 236 is connected to a negative power terminal 258. A capacitor 260 has one lead connected to negative power terminal 258 and the other lead connected to ground 130. A resistor 262 is connected between the negative power terminal 258 and the marginal oscillator output lead 28. A capacitor 264 is connected between ground 130 and the output lead 28. A collector 268 of transistor 254 is also connected to the output 28. A base lead 270 of the transistor 254 is connected to ground 130. A capacitor 272 has one lead connected to the lead wire 14 going to the input of the marginal oscillator and the other lead wire connected to a junction point 274. A voltage variable capacitor 276 is connected between the junction points 274 and ground 130. The element 276 is a semiconductor diode utilizing one of the properties of voltage variable capacitance present in most semiconductor diodes. A resistor or resistive element 275 is connected between the junction point 274 and a junction point 278. A capacitive element 280 is connected between the junction point 278 and ground 130. A resistive element 282 is connected between the junction point 278 and input terminal 222.

Figure 3:
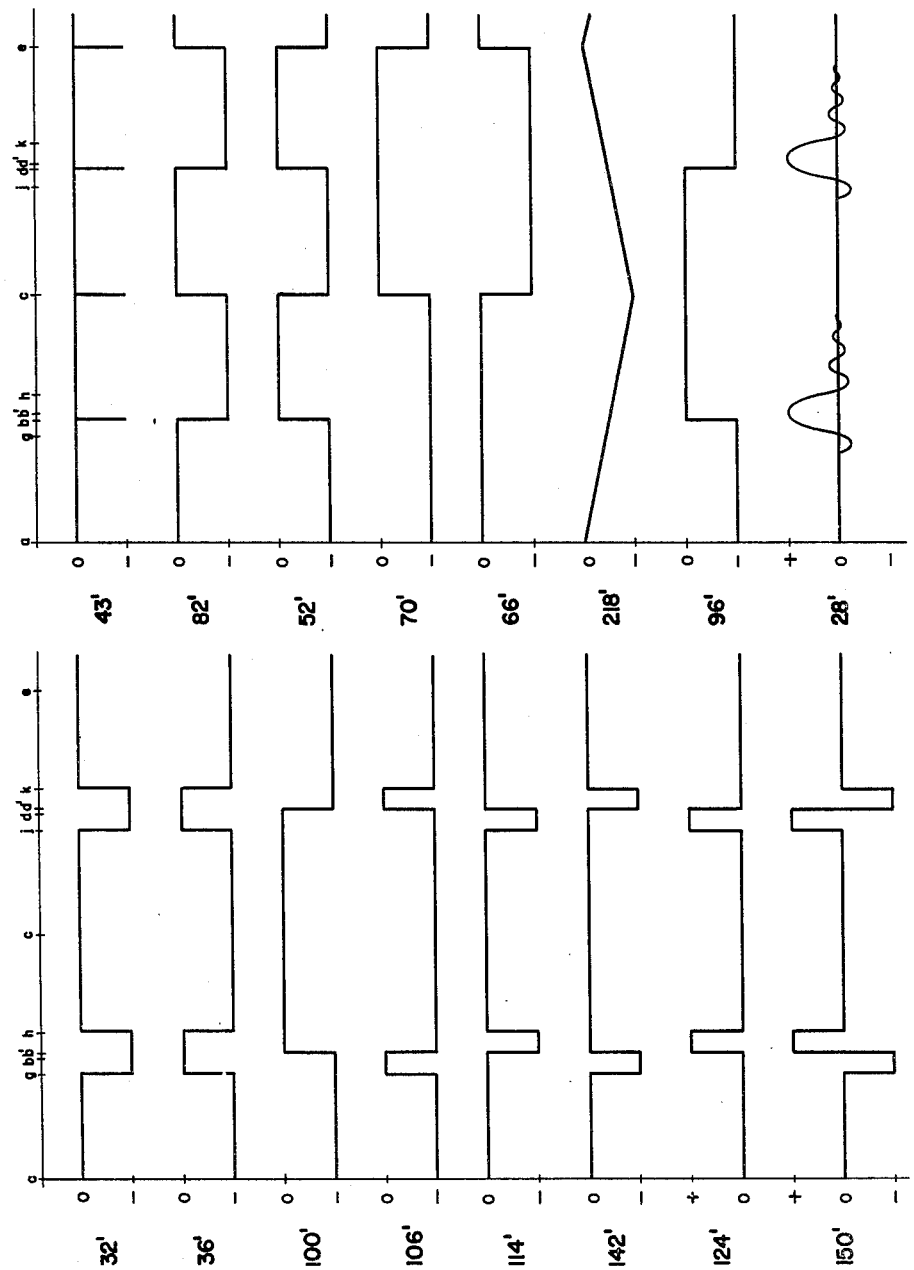
FIGURE 3 presents various wave forms used to obtain a better understanding of the method of operation of the diagram shown in FIGURE 1.

In FIGURE 3 a reference numeral is given to the various time charts which is a primed number of the point in FIGURE 1 at which a waveform of the type shown may be found. In other words, the waveform 28′ in FIGURE 3 is a signal denoting the nuclear absorption curve found on lead 28 in FIGURE 1 between the marginal oscillator 12 and the amplifier 26. The waveform 32′ is the signal appearing at junction point 32 and the curve 36′ is the signal appearing at lead 36 and so forth through the circuit. It will be noted that in all of the waveforms except 150′ and 124′ the signal only goes negative with respect to ground or reference voltage which is zero in this set of waveforms. In FIGURE 3, pulses a, b, c, d and e are used to provide a reference time to facilitate description of the operation of the circuit and to designate the time sequence of pulses from the clock generator waveforms 43′. The additional points, b′, d′, g, h, j and k are used to facilitate discussion pertinent to the means of obtaining the final waveform shown as 150′.

*Operation*

The marginal oscillator shown in FIGURE 2 will be discussed prior to the device shown in FIGURE 1. As mentioned before the material 18 is preferably water. However, it may be any other substance which has nuclei or protons capable of resonance at some combination of frequency and field strength in the case of magnetic resonance or at some frequency in the application or use of electric quadrupole moments. The oscillator shown in FIGURE 2 is termed a marginal oscillator since it is designed so that it is only marginally oscillating or in other words that very little disturbance in the tank circuit will disturb the amplitude of oscillation of the oscillator. The tank circuit is composed mainly of the capacitor 230, the voltage variable capacitive diode 276 and the coil 10. The coil 10 has a combination air and liquid core in the preferred embodiment. The frequency of oscillation of the marginal oscillator is affected or modulated by the use of the capacitive element 276 connected between lead 14 and ground 130. A voltage applied to input 222 will produce a change in the effective capacitance of element 276 and thereby modulate or change the frequency of oscillation of the marginal oscillator. As the oscillator is changing in frequency it will approach the frequency at which resonance occurs in the nuclei of the material 18. At this point, the oscillator will change in amplitude of oscillation due to the disturbance of the core for coil 10 and a waveform similar to 28′ in FIGURE 3 will be produced. The actual oscillator consists of the transistor 236 along with its associated components and the tank circuit as above mentioned. The change in amplitude of oscillation of this oscillator is detected through the coil 250 to produce the signal at junction point 28 by means of a transistor 254 which is connected in the common base configuration. A more complete description of the operation of this oscillator amplifier may be found in the above-mentioned copending application, Serial Number 131,797. A readout or display means 24 is connected to terminal 22 to give an output indicative of the average or central frequency of the range over which the oscillator 12 is modulated.

In FIGURE 1 the marginal oscillator 12 produces an output signal shown as 28′ in FIGURE 3, as mentioned in the above paragraph, upon each occurrence of nuclear resonance of the material 18. This signal is amplified by the amplifier 26 and clipped by the clipping means 30 to produce the signal shown in FIGURE 3 as 32′. For the moment it may be assumed that some of the other waveforms are as shown and the method of obtaining these waveforms will be discussed later. In this specification, a signal is by definition in an ON condition when it is of negative polarity. The AND circuit 41 will only produce an output signal when two negative input signals are applied at inputs 40 and 104. In observing the waveforms 32' and 100', it will be noted that from point g to point b' both inputs are negative and therefore an output signal is obtained at point 106. The AND circuit 41 is in a sense a polarity inverter as two negative input signals turn the circuit to an OFF condition and thereby produce a positive going pulse from the negative supply voltage which is normally obtained as an output from the AND circuit 41. This output signal is shown as waveform 106'. The waveform shown as 28' is referred to as a line or as a nuclear resonance absorption curve or sometimes as a resonance line. A line in nuclear resonance terminology is the width of the pulse between two points which designate .707 or 70.7% of the total power absorbed during resonance. Thus the width of each pulse in the waveforms 32' or 36' may be designated as a line width. If the reference wave form 100' is changing from one condition to a second condition at a point half-way between the two sides of the pulse contained in 32' (i.e. point b') the resultant pulse shown in waveform 106' can be designated as a pulse of one-half line width. The inverter 34 takes the waveform shown as 32' and inverts it to produce the signal shown as 36'. It may be noticed by referring to waveforms 36' and 100' that until time b' there is always a negative signal into the OR circuit 38. The OR circuit 38 will produce an OFF or zero output signal as long as one or the other input is in the negative condition. At time b' both inputs to the OR circuit 38 go in the positive direction and therefore the output 114 shown in waveform 114' goes in a negative direction signifying that there is no input being applied. The OR circuit 38 is again a sort of polarity inversion circuit in that when both inputs go in the positive direction the output goes in a negative direction.

The waveform of 114' is passed through the AND circuit 118 and inverted in form when there is an input both at the input 116 and at the input 198. The signal is then applied to the polarity inverter 122 and produces the waveform shown as 124' which is positive with respect to ground. The signal 106' is applied to the OR circuit 112 and as long as no signal appears from the flip-flop 186 at input 192 the signal shown as wave form 106' will pass through to the inverter 140 and appear at the output as waveform 142'. When an ON or negative input signal is applied to the input 192, the OR circuit 112 is placed on a permanently OFF or grounded condition so that no output pulse may be obtained from signals appearing at input 110. The two signals 124' and 142' are combined in the summing amplifier 134 to produce the waveform shown as 150'. If the marginal oscillator 12 is operating at the resonant frequency, and if the resonant frequency is in the center of the band of frequencies which are obtainable through the use of the search ramp generator 204, the resultant signal shown at 150' will average out to zero error signal. Under these conditions no resultant error signal will be applied from the summing amplifier 134 to change the center or average frequency of operation of the marginal oscillator 12. Under these conditions the frequency of operation of marginal oscillator 12 will merely be varied periodically by the signal from ramp generator 76. If, however, the frequency at which resonance occurs is to one side or the other of the center of the band of frequencies obtainable by the search ramp generator 204, the signal 150' will have to contain a constant error signal or direct voltage signal to keep the marginal oscillator 12 oscillating around this center frequency. The signal 150' is able to affect the frequency of operation of marginal oscillator 12 to approximately the same extent as the signal obtained from the search ramp generator 204. Therefore, when a resonance signal is obtained through the use of the search ramp generator 204, the feedback signal 150' will have a resultant direct voltage component which will keep the average frequency of operation of marginal oscillator 12 at the resonant frequency of the material 18 as the conditions existing at that time. If the conditions change so that the resonant frequency of the material 18 changes, the shape of signal 150' will suddenly alter due to the variation in widths of the signals 106' and 114'. This additional error signal will again alter the average frequency of operation of the marginal oscillator 12 until the average frequency coincides with the resonant frequency of material 18. As may be observed, in this specification the terms "average frequency" and "center frequency" of the marginal oscillator 12 have been used interchangeably.

If the pulse 28' occurs completely on one side or the other of the reference pulse b or its delayed time period b', the signal 150' will be either completely positive or completely negative depending upon the phase of the system. This direct voltage component will quickly change the average frequency of operation of oscillator 12 so as to keep the pulse 28' as near the center of the ramp signal 218' as is possible. As may be determined, the average frequency of operation of marginal oscillator 12 is only the same as the resonant frequency of material 18 when the oscillator 12 is operating in the center of the possible range of frequency variation. However, the error which occurs as the average frequency varies from this center of operation frequency is a straight line function and is therefore easily calculable and this consideration may be easily taken into account in reading the frequency from counter 24. Also, if desired, a compensation circuit can be designated into counter 24 to take care of this straight line error function.

An explanation will now be given of how the waveform shown as 100' is obtained. The clock pulses shown in waveform 43' appear at spaced intervals shown as a, b, c, d, etc. The negative pulses such as a and b operate the flip-flop 50 to produce the waveform 42' at one terminal and the waveform 82' at the other terminal. The flip-flop 50 therefore operates and switches to the opposite condition upon the application of each pulse to its input 46. The waveform shown as 52' is applied from the flip-flop 50 to the AND circuit 48. The AND circuit 48 produces an output signal whenever both inputs are going in the negative direction at the same time. Thus the AND circuit produces an output signal at times a, c, and e. The flip-flop 64 therefore operates on every other clock pulse due to the gating arrangement of the AND circuit 48. The outputs of the flip-flop 64 are shown as waveforms 66' and 70'. The output 70' is used to provide an input to the ramp generator 76 for production of the sweep signal shown as 218. The ramp generator 76 can be of any type which will integrate the input signal and thereby produce a linear integrated output signal. The AND circuits 80 and 60 require two ON or negative input signals to produce an output signal. In observing the waveforms 52', 66', 70' and 82', it may be observed that the signals 52' and 66' are of the same negative polarity between the points c and d as are the signals 70' and 82' between points b and c. The output signals from AND circuits 60 and 80 are applied to the OR circuit 90 and the resultant signal 96' is obtained which indicates the times at which either AND circuit is in an ON condition. When either AND circuit provides a negative output signal the waveform shown as 96' is at ground potential. The waveform shown as 96' is delayed by the delay network 98 to produce the waveform shown as 100'.

The reason for delaying the signal shown as 96' to the point in time shown as 100' is due to the fact that delays may be found in the amplifier 26 to effectively delay the peak to b' even though resonance occurs at point b on the waveform 28'. If there is no delay in the amplifier 26, the delay network 98 may be deleted in some circuits. By delaying the waveform 96' the amount of time between points b and b', the oscillator will produce an average frequency which is indicative of the actual nuclear resonant frequency instead of the frequency which must have a predetermined value subtracted from it in order to be correct. In one application of this device the delay was approximately one millisecond and the delay network was designed accordingly. If there is no inconvenience in having the average frequency of the signal obtained from the marginal oscillator being a predetermined value lower than that indicated, the delay network 98 is not required.

In discussing the passage of the pulses or waveforms shown as 106′ and 114′ through the AND circuit 118 and the OR circuit 112 it was assumed that a negative input and a grounded input would be obtained at points 198 and 192, respectively. The only time this condition is obtained is when the signal or waveform shown at 32′ is actually present. The signal shown as waveform 32′ is applied through the line 156 to the one-shot multivibrator 158 to provide an alternating output signal which is applied to the integrator 162. The integrator 162 only supplies an output signal for a short period of time after the input signal disappears. When an output signal is applied to junction point 164, this signal in conjunction with the clock pulses coming from the clock 42 operate the AND circuit 170 to keep the flip-flop 186 in a condition such that the passage of the pulses shown as waveforms 106′ and 114′ will be obtained. If the pulses shown as waveforms 32′ do not appear for a given length of time the integrator produces a voltage or lack of voltage as the case may be which is opposite from its normal energized condition so that no input is obtained at the AND circuit 170. This lack of input is inverted by the inverter 166 and produces an input to the AND circuit 176. At the next application of a pulse from clock 42, the AND circuit 176 produces an output to change the flip-flop 186 to a second state or condition. In this second condition the signal is applied to the OR circuit 112 and a ground or absence of signal is applied to the AND circuit 118. Without a signal to the AND circuit 118 passage of any signal applied to the input 116 is eliminated. With a signal applied to the input 192 of OR circuit 112, the effect of any signal applied to input 110 is eliminated. As mentioned before, an OFF condition or zero output is obtained at the junction point 196 and this lack of a signal allows the signal from the search generator 204 to be applied to the input 210 of the amplifier 154. In the condition where an output pulse was assumed to be appearing from the clipper 30 at the junction point 32, the junction point 196 did have an output signal and it controlled the OR circuit 202 so that the signal from the generator 204 did not appear at the output 208 of the OR circuit 202. The signal from the search ramp generator 204 varies over a much wider range than the signal from the ramp generator 76. The search generator 204 sweeps the marginal oscillator 12 over a very wide range of frequencies in the order of several megacycles until the pulse is produced at the output of the marginal oscillator 12. When an output pulse is produced a signal again appears at the junction point 164 from the integrator 162 and changes the flip-flop 186 to a condition whereby passage of signals is allowed to the AND circuit 118 and the OR circuit 112 at the next time a clock pulse is applied to the AND circuit 170. The ramp generator 76 then keeps the marginal oscillator 12 varying about the frequency indicative of the nuclear resonance frequency. The amount of variation is limited or determined by the circuit design of the oscillator 12 and the generator 76. This frequency range is very narrow compared with that obtained when the signal from the search generator 204 is applied to the marginal oscillator 12. It should be noted that the signal 150′ must be able to have nearly as much effect on oscillator 12 as the signal from search generator 204 so as to be able to hold the apparatus in resonance at any point on the search ramp signal.

The range of sweep obtained in using this particular feedback network can be much smaller than that used in the above-mentioned co-pending application and therefore inherent nonlinearities of the voltage to frequency transducer used in this system which is the voltage variable capacitor 276 can thereby be reduced. Greater accuracy is also obtained in that the middle of the resonance absorption curve is used as a reference point instead of the leading edge.

The various blocks in FIGURE 1 are not shown to have any power supplied thereto. It is to be understood that power must be supplied to some of the blocks and also to the power terminal in FIGURE 2. All the blocks shown in FIGURE 1 are standard circuits and the invention is in the system and feedback aspects. The variable frequency oscillataor shown in FIGURE 2 is not a particularly new circuit but it is shown in the event that using the term "marginal oscillator" might confuse someone reading this specification.

While I have shown and described only one particular feedback circuit and mentioned only two applications, many other applications of this invention will be obvious to anyone skilled in the art and I wish to be limited only by the appended claims in which I claim:

1. In apparatus of the class described:
oscillator means including field producing means adapted to provide a first output signal indicative of the resonance absorption curve of a material upon an occurrence of nuclear resonance of the material situated within a field produced by said oscillator means;
reference signal supplying means for supplying a second output signal which changes between first and second characteristics;
means connected to receive said first output signal and connected to said reference signal supplying means and adapted to provide third and fourth output signals in the form of pulses which are of a total width, between leading and trailing edges, indicative of the width of said first output signal and are inversely pulse width modulated with respect to each other, the width of said pulses being dependent upon the time relation between the occurrence edge of said first output signal which is indicative of the low frequency edge of the absorption curve and the change from one characteristic to the other of said second output signal;
first signal generating means connected to said reference signal supplying means and adapted to produce a first sweep signal;
second signal generating means, said second signal generating means being adapted to provide a second sweep signal;
first summing means including input and output means; logic means connected to receive said first, third and fourth output signals and said second sweep signal and adapted to apply said second sweep signal to said first summing means whenever said first output signal is not present and adapted to switch out said second sweep signal and to apply said third and fourth output signals to said first summing means when said first output signal is present;
and second summing means connected to receive said output signals from said logic means and said first signal generating means and connected to apply the resultant signal to said oscillator means to modulate the frequency of said oscillataor means, said second signal generating means having a greater modulation effect on said oscillator means than has said first signal generating means.

2. In apparatus of the class described:
modulatable oscillator means including field producing means adapted to provide a first output signal upon an occurrence of nuclear resonance of a material situated within a field produced by said oscillator means;

readout means connected to receive a signal from said oscillator means and adapted to provide an output indicative of the frequency at which resonance occurs in the material;

reference signal supplying means for supplying a second output signal which changes between first and second characteristics;

means connected to receive said first output signal and connected to said reference signal supplying means and adapted to provide third and fourth output signals which are of a total width indicative of the width of said first output signal and are inversely pulse width modulated with respect to each other, the width of said pulses being dependent upon the time relation between the occurrence of said first output signal and the change from one characteristic to the other of said second output signal;

first signal generating means connected to said reference signal supplying means and adapted to produce a first sweep signal which commences at a predetermined time with respect to said second output signal;

second signal generating means, said second signal generating means being adapted to provide a second sweep signal;

first summing means including input and output means;

logic means connected to receive said first, third and fourth output signals and said second sweep signal and adapted to apply said second sweep signal to said first summing means whenever said first output signal is not present and adapted to switch out said second sweep signal and to apply said third and fourth output signals to said first summing means when said first output signal is present; the characteristics of the second sweep signal being such that modulation of said oscillator means can be obtained through a greater range than is obtainable with the first sweep signal;

and second summing means connected to said output means of said logic means to receive signals therefrom, connected to said first signal generating means to receive the first sweep signal therefrom and connected to apply an output signal resulting from said received signals to said oscillator means to modulate the frequency of said oscillator means.

3. In nuclear resonance control systems:

variable frequency oscillator means, including field producing means;

liquid material means situated within a field produced by said field producing means;

readout means adapted to give an output indicative of the average frequency of operation of said oscillator means; first amplifier means connected to said oscillator means and adapted to provide a first output signal upon occurrence of resonance in said material means;

inverter means connected to receive said first output signal and adapted to produce a second output signal;

clock pulse producing means;

first gating means connected to receive said first output signal and to receive a signal from said clock pulse producing means and adapted to produce a third output signal of a width indicative of the time differential between the low frequency edge of said first output signal and a predetermined time with respect to the signal received from said clock pulse producing means;

second gating means connected to receive said second output signal and the signal from said clock pulse producing means and adapted to produce a fourth output signal of a width indicative of the time differential between the high frequency edge of said first output signal and a predetermined time with respect to the signal received from said clock pulse producing means;

third gating means connected to receive said first output signal, adapted to produce a fifth output signal indicative of the occurrence of said first output signal, and adapted to produce a sixth output signal whenever the first output signal is not received by said third gating means;

fourth gating means connected to receive said third, fourth, fifth and sixth output signals and adapted to combine said fourth and fifth signals to produce a seventh output signal when said fifth and sixth output signals are in a predetermined relation;

first ramp generator means connected to receive the signal from said clock pulse producing means and adapted to produce a first ramp signal of a predetermined time relationship with respect to the signal received from said clock pulse producing means;

second search ramp generator means for producing a second ramp signal;

fifth gating means connected to said second generator means and connected to receive said fifth output signal, said fifth gating means being adapted to allow passage of said second ramp signal upon receipt of said output signal in a predetermined condition;

and summing means connected for receiving signals from said first and second ramp generator means and for receiving said seventh signal and adapted to combine the above mentioned signals and to apply them to said variable frequency oscillator means for varying the frequency thereof.

4. In nuclear resonance control systems:

variable frequency oscillator means, including first and second input means and first and second output means;

field producing means connected to the first input of said oscillator means;

liquid material means situated within a field produced by said field producing means;

readout means connected to said first output of said oscillator means and adapted to give an output indicative of the average frequency of operation of said oscillator means;

first amplifier means connected to said second output means of said oscillator means and adapted to provide a first output pulse upon occurrence of resonance in said material means;

clipper means connected to receive the output of said first amplifier means and adapted to produce a second output signal of a predetermined magnitude;

inverter means connected to receive said second output signal and adapted to produce a third output signal;

clock pulse generating means for providing a fourth output signal;

means connected to said clock pulse generating means, adapted to produce a reference fifth output signal having periodic changes in a characteristic thereof;

first gating means connected to receive said second and fifth output signals and adapted to produce a sixth output signal of a width indicative of the time differential between the low frequency edge of said first output pulse and the occurrence of a change in a characteristic of said fifth output signal;

second gating means connected to receive said third and fifth output signals and adapted to produce a seventh output signal of a width indicative of the time differential between the high frequency edge of said first pulse and the occurrence of a change in a characteristic of said fifth output signal;

third gating means connected to receive said second output signal, adapted to produce an eighth output signal indicative of the occurrence of said second output signal, and adapted to produce a ninth output signal whenever the second output signal is not received by said third gating means;

fourth gating means connected to receive said sixth, seventh, eighth and ninth output signals and adapted to combine said sixth and seventh signals to produce a tenth output signal when said eighth and ninth output signals are in a predetermined relation;

first ramp generating means connected to receive signals from said clock pulse generating means and adapted to produce a first ramp signal commencing at a predetermined time with respect to said fourth output signal;

second search ramp generating means for producing a second ramp signal;

fifth gating means connected to said second generating means and connected to receive said eighth output signal, said fifth gating means being adapted to allow passage of said second ramp signal upon receipt of said eighth output signal in a predetermined condition;

and summing means connected to receive said first and second ramp signals and said tenth signal and adapted to combine said above mentioned signals and to apply them to said second input means of said variable frequency oscillator means.

5. In nuclear magnetic resonance control systems for measuring magnetic field strengths:

variable frequency oscillator means, including first and second input means and first and second output means;

field producing means connected to the first input of said oscillator means;

means producing a magnetic field to be sensed;

liquid material means situated within a field produced by said variable frequency field producing means and within said magnetic field;

readout means connected to said first output of said oscillator means and adapted to give an output indicative of the average frequency of operation of said oscillator means;

first amplifier means connected to said second output means of said oscillator means and adapted to provide a first output pulse indicative of the nuclear resonance absorption curve upon occurrence of resonance in said material means;

clipper means connected to receive the output of said first amplifier means and adapted to produce a second output signal of a predetermined magnitude;

inverter means connected to receive said second output signal and adapted to produce a third output signal;

clock pulse producing means for providing a fourth output signal having periodic changes in a characteristic thereof;

means connected to said clock pulse producing means, adapted to produce a reference fifth output signal;

first gating means connected to receive said second and fifth output signals and adapted to produce a sixth output signal of a width indicative of the time differential between the low frequency edge of the nuclear resonance absorption curve and the occurrence of a change in the characteristic of said fifth output signal;

second gating means connected to receive said third and fifth output signals and adapted to produce a seventh output signal of a width indicative of the time differential between the high frequency edge of the nuclear resonance absorption curve and the occurrence of a change in a characteristic of said fifth output signal;

third gating means connected to receive said second output signal, adapted to produce an eighth output signal, and adapted to produce a ninth output signal whenever the second output signal is not received by said third gating means;

fourth gating means connected to receive said sixth, seventh, eighth and ninth output signals and adapted to combine said sixth and seventh signals to produce a tenth output signal when said eighth and ninth output signals are in a first predetermined relation;

first ramp generator means connected to receive signals from said clock pulse producing means and adapted to produce a first ramp signal of a predetermined time relationship with respect to said fourth output signal;

second search ramp generator means for producing a second ramp signal;

fifth gating means connected to said second generator means and connected to receive said eighth output signal, said fifth gating means being adapted to allow passage of said second ramp signal when said eighth and ninth output signals are in a second predetermined condition;

and summing means connected to receive said first and second ramp signals and said tenth signal and adapted to combine said above mentioned signals and to apply them to said second input means of said variable frequency oscillator means.

6. In nuclear resonance circuitry:

variable frequency field producing means adapted for producing resonant effects in materials, said materials having a nuclear resonant frequency and being situated in a field produced by said variable frequency field producing means;

ramp means connected to said variable frequency field producing means and adapted for periodically varying the frequency of operation of said variable frequency field producing means about an average frequency;

means connected to said variable frequency field producing means and adapted for producing a first output pulse upon each occurrence of nuclear resonance;

means adapted to receive said first output signal and to separate said first pulse into second and third pulses of opposite polarities;

means for combining said opposite polarity second and third pulses to produce a resultant error signal;

and means for receiving said error signal, said error receiving means being connected to said variable frequency field producing means and adapted to vary the average frequency of operation of said variable frequency field producing means toward the frequency at which nuclear resonance occurs.

7. In nuclear resonance circuitry:

variable frequency field producing means adapted for producing resonant effects in materials, said materials having a nuclear resonant frequency, which are situated in the field produced by said variable frequency field producing means;

ramp means connected to said variable frequency field producing means and adapted for periodically varying the frequency of operation of said variable frequency field producing means about an average frequency;

means connected for producing a first output pulse indicative of the resonance absorption curve upon each occurrence of nuclear resonance;

means for producing reference time pulses;

means adapted to receive said first output signal and to separate said first pulse into second and third pulses of opposite polarities, the width of the second and third pulses being indicative of the width of said first pulse, and the width of the second pulse being determined by the time of occurrence of nuclear resonance with respect to the time of occurrence of the reference pulse;

means for combining said second and third pulses to produce an error signal;

summing means for receiving said error signal connected for varying the average frequency of operation of said variable frequency field producing means toward the frequency at which resonance occurs;

means for supplying a search signal to said summing means;

and means for connecting said search signal supplying means to said summing means.

8. In nuclear resonance circuitry:

variable frequency field producing means adapted for producing resonant effects in materials, said materials having a nuclear resonant frequency, which are situated in the field produced by said variable frequency field producing means;

ramp means connected to said variable frequency field producing means and adapted for periodically varying the frequency of operation of said variable frequency field producing means about an average frequency;

means connected for producing a first output pulse indicative of the resonance absorption curve upon each occurrence of nuclear resonance;

means for producing reference time pulses;

means adapted to receive said first output signal and to separate said first pulse into second and third pulses, the total width of the second and third pulses being indicative of the width of said first pulse, and the width of the second pulse being determined by the time of occurrence of the low frequency edge of the resonance absorption curve with respect to the time of occurrence of the reference pulse;

means for combining said second and third pulses to produce an error signal;

summing means for receiving said error signal connected for varying the average frequency of operation of said variable frequency field producing means toward the frequency at which resonance occurs;

means for supplying a search signal to said summing means;

and means connecting said search signal supplying means to said summing means, said connecting means being adapted to automatically disconnect the search signal being applied to said summing means upon occurrence of an output pulse denoting nuclear resonance, said search signal being adapted for providing a greater variation in frequency of operation of said variable frequency field producing means then is obtained by said ramp means.

References Cited in the file of this patent

UNITED STATES PATENTS

| | | |
|---|---|---|
| 2,802,943 | Hershberger | Aug. 13, 1957 |
| 2,888,638 | Nelson | May 26, 1959 |
| 2,912,641 | Ruble | Nov. 10, 1959 |
| 2,922,947 | Bloom et al. | Jan. 26, 1960 |

OTHER REFERENCES

Nolle et al.: The Review of Scientific Instruments, vol. 28, No. 11, Nov. 1957, pp. 930 to 932.